April 22, 1941.                G. HANIQUET                2,239,320
TOWING ATTACHMENT
Filed Feb. 14, 1939
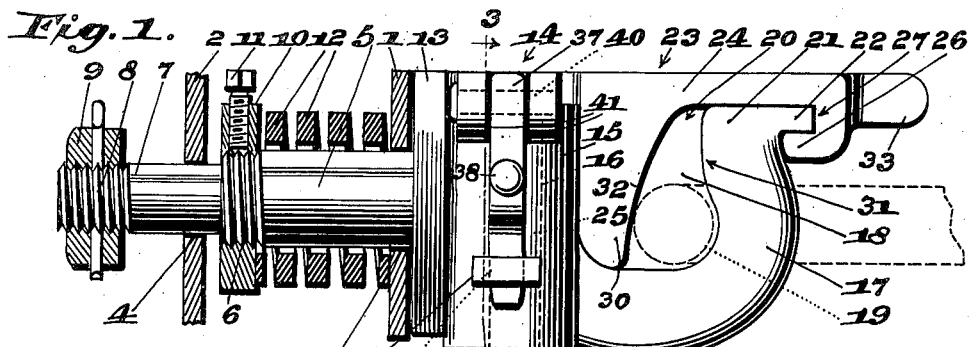
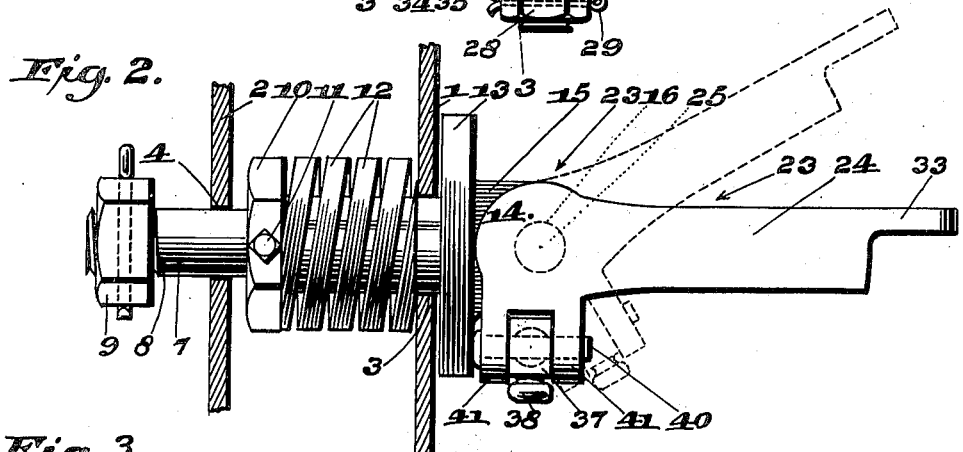
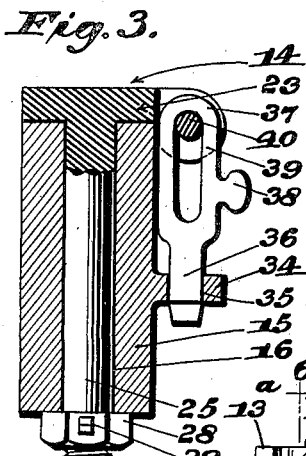
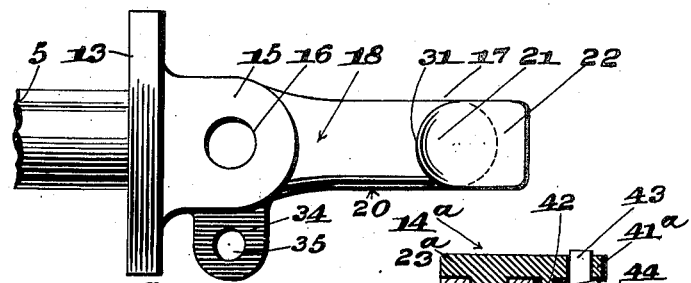
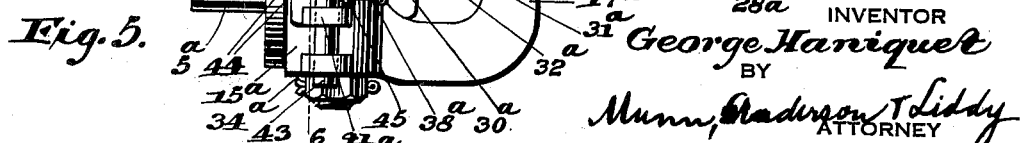
INVENTOR
George Haniquet
BY
Munn, Anderson & Liddy
ATTORNEY Patented Apr. 22, 1941

2,239,320

UNITED STATES PATENT OFFICE 2,239,320

TOWING ATTACHMENT

George Haniquet, Glendale, Calif.

Application February 14, 1939, Serial No. 256,351

7 Claims. (Cl. 280—33.15)

This invention relates to improvements in towing attachments, and although it is primarily intended for use as a coupling between an automobile and a trailer, yet the draft vehicle may be otherwise than an automobile without affecting either the structure or principle of operation of the attachment in the least. An important consideration in a towing attachment is the relative ease with which connection and disconnection of the trailer tongue may be made.

In some types of towing attachments it is necessary to do this work with a wrench and since the latter is not always at hand, it follows that coupling and uncoupling is not capable of accomplishment with ease. Another purpose of a towing attachment is to diminish the loose play in the coupling. To do this diminishes rattling. The purposes thus enumerated are accomplished by the invention, the objects of which are as follows:

First, to provide a towing attachment which is constructed with the primary purpose in mind of easy connection and disconnection of the trailer tongue, but at the same time to assure the retention of said tongue when coupled to the hook.

Second, to provide a swingable lock for the carrying out of the foregoing purposes, one of the features of said lock being the back-lash reducer which insures a virtually non-rattling coupling of the trailer tongue.

Third, to provide a reliable latch which is permissibly made in either of several forms, for the purpose of keeping the lock from swinging when the trailer tongue is coupled on.

Other objects and advantages will appear in the following specification, reference being had to the accompanying drawing, in which:

Figure 1 is a partially sectional and side elevational view of the towing attachment.

Figure 2 is a plan view of the latter, parts of the draft vehicle being shown in section.

Figure 3 is a cross section taken on the line 3—3 of Fig. 1, parts being shown in elevation.

Figure 4 is a plan view of the hook.

Figure 5 is a side elevation of the towing attachment, disclosing a modified type of latch.

Figure 6 is a cross section taken on the line 6—6 of Fig. 5.

In each of Figs. 1 and 2 the draft vehicle is represented by the cross member 1 and a cross guide 2. These members may comprise part of a bumper structure, although not necessarily so. These members have openings 3, 4, of different sizes. A stub shaft 5 is slidable in the opening 3. This stub shaft has a threaded terminal 6 adjacent to the member 2, the opening 4 of the latter slidably containing the stem 7 which is a continuation of the stub shaft. The stem is threaded at 8 and carries a nut 9. A collar 10 is screwed onto the threads 6 in which position it is fixed by a set screw 11.

The collar 10 abuts one end of a heavy coil spring 12, the other end of which bears against the inside of the cross member 1. A flange 13 on the outside of this cross member is adapted to be pulled against said cross member when the spring 12 is permitted to expand. But when the towing attachment is loaded, as when the tongue of a trailer is coupled to it, the spring 12 is partly compressed, and its resilience provides a yieldable connection between the towing attachment and the draft vehicle.

The towing attachment is generally designated 14. All of the parts already described, excepting the members 1, 2, are included in the towing attachment. The latter has a hub 15 adjacent to and integral with the flange 13. This hub has a longitudinal bore 16. The hub has an attached hook 17, the hook space 18 of which is adapted to be partly occupied by the tongue 19 of a trailer (not shown). This tongue is inserted through the opening 20 of the hook space. The extremity 21 of the hook has a lip 22. This lip extends in the axial direction of the towing attachment and it is adapted to interengage a lock 23.

This lock is swingable to open and close the opening 20. The lock is swung to one side (dotted lines, Fig. 2) to admit the tongue 19, thereafter being swung back to hold the tongue in coupled relationship with the towing attachment 14. Said lock 23 comprises a bar 24 which has a stud 25 on one end, and a spaced lip 26 adjacent to the other end. This lip is spaced from the bar 24 at 27 and it is this space which is adapted to be occupied by the lip 22 of the hook in order to make the previously mentioned interengagement of the lock with the hook.

The stud 25 occupies and is turnable in the longitudinal bore 16. It is held in place by a nut 28 which is keyed on by a cotter pin 29. The bar 24 has a filler 30 which projects therefrom on the nether side. Said filler is adapted to partly fill the hook space 18 when the bar 24 bridges the opening 20, thereby sufficiently diminishing the hook space to prevent idle motion of the tongue 19 in said space. The filler 30 therefore comprises back-lash reducing means.

It is to be noted in Fig. 1 that the contactible wall 31 of the hook 17 has a forward curvature. This wall is confronted by the fairly sharp backward curvature 32 of the filler 30. These curvatures cause an upward constriction of the hook space which confines the tongue 19 to the bottom and largest part of the space and prevents said tongue from objectionably riding upwards.

A finger-piece 33 on the lock 23 provides for its convenient turning in respect to the hub 15. The latter has a keeper 34 with a hole 35. This hole is adapted to be entered by the point 36 of a latch 37. The latch has a finger-piece 38 for its manipulation, and said manipulation consists of sliding the latch by virtue of its slot connection 39 with the connecting pin 40 between a pair of lugs 41 on the lock 23. The lugs 41 extend laterally of the bar 24 and overhang the hub 15.

A modification of the foregoing latch comprises the employment of a lug plate 42 (Figs. 5 and 6) for the mounting of the pair of lugs 41a. These are the equivalents of the lugs 41 inasmuch as they carry the latch. But in the modification the latch consists of a slidable bolt 43 which is controlled by a spring 44. The finger-piece 38a provides the anchorage for one end 45 of the spring. The other end 46 is anchored to one of the lugs 41a. The spring is an expansion spring and being such it tends to urge the bolt into engagement with the hole 35a of the keeper 34a. This mode of anchorage of the spring also presses the finger-piece 38a against the lug plate 42. The latter carries a rest 47. The remainder of the structure in Figs. 5 and 6 is identical with that already described, the corresponding numerals being distinguished by the dotted exponent letters a.

In operation it is only necessary to press upon the finger-piece 33 to swing the lock 23 to the open position (dotted lines, Fig. 2) after having released the latch 37 from the keeper 34. The trailer tongue 19 is then emplaced in the hook space 18 at the bottom of which space it is held because of the constriction 31, 32. The interengagment of the lips 22, 26 prevents the lock 23 from being lifted up at its otherwise free end.

The same mode of operation obtains in the instance of the modification in Figs. 5 and 6. The only exception is that prior to swinging the lock 23a the latch bolt 43 is lifted by means of the finger-piece 38a against the tension of the spring 44 and is seated upon the rest 47 where it is held by the same tension. The lock 23a is then free to be swung both outwardly and back, and when it is restored to its bridging position, the finger-piece 38a is simply given an outward flip, whereupon the spring urges the point of the latch into the hole 35a of the keeper 34a.

In conclusion it is desired to point out that the particular structure of the lock 23 is especially adaptable to the disengagement of the trailer tongue and the subsequent driving away of the truck or other hauling vehicle. The tongue of a heavily loaded trailer can be raised vertically by a single man power, but a great effort is required to be expended to move the same trailer sidewise.

By providing for the lateral swinging of the lock 23 (dotted lines Fig. 2), the displacement of said lock to one side enables a vertical lift of the tongue 19 directly out of the hook space. A momentary holding of the tongue in the elevated position enables the operator to swing the lock 23 back to its closed position, whereupon the trailer tongue is let down and rested on the upper part of the lock. Said upper part is perfectly smooth, and desirably so, because having rested the trailer tongue on top of the lock, it becomes possible to drive the truck forwardly, letting the tongue 19 slip off of the lock and drop to the ground.

If there were any upward projection of any sort on the lock 23 this sliding function could not be obtained. The tongue would be prevented from slipping off in the manner stated by even the slightest upward projection.

I claim:

1. A towing attachment comprising a hub having a hook, one of the walls defining part of the hook space and having a curvature, a lock movably carried by the hub to bridge the hook opening, and a projection on said lock adapted to occupy part of the hook space, said projection having a curvature confronting the curved wall of the hook in a reverse direction, defining a constriction to prevent the motion of a trailer tongue occupying the largest part of the hook space.

2. A towing attachment comprising a hub having a hook, a lock to bridge the hook opening and having a projecting filler extending into the hook space to provide a trailer tongue backlash reducer, means turnably connecting the lock to the hub permitting swinging the lock in reference to the hook, at least one lug carried by the lock and overhanging the hub, a keeper affixed to the hub, and a latch movably attached to the lock-lug and engageable with the keeper to secure the lock in its bridging position.

3. A towing attachment comprising a hub having a hook, a lock to bridge the hook opening and having a projecting filler extending into the hook space to provide a trailer tongue back-lash reducer, means turnably connecting the lock to the hub permitting swinging the lock in reference to the hook, at least one lug carried by the lock overhanging the hub and having a pin, a latch which is slotted to ride the pin, and a keeper on the hub with which the latch is engageable to secure the lock in the bridging position.

4. A towing attachment comprising a hub having a hook, a lock to bridge the hook opening and having a projecting filler extending into the hook space to provide a trailer tongue backlash reducer, means turnably connecting the lock to the hub permitting swinging the lock in reference to the hook, a lug plate carried by the lock, overhanging the hub and having a pair of lugs, a latch guided by the lugs and having a finger-piece, a keeper on the hub with which the latch is engageable to secure the lock in its bridging position, a rest on the plate to support the finger-piece in the disengaging position of the latch, and a spring carried by the latch, anchored to one of the plate lugs and to the finger-piece to tend to constantly keep the finger-piece in line with the rest.

5. A towing attachment comprising a hook, an erect hub forming part of the hook and defining a hook space in which a trailer tongue is adapted to be coupled, means on the hub for connecting the hook to a draft vehicle, a lock having a stud turnably carried by the hub allowing swinging the lock across the hook space to close it for the retention of said tongue, and means projecting downward from the lock, riding beside the hub and taking a position in the hook space next to the hub and reducing said space for a close fit of said tongue.

6. A towing attachment comprising a hook, an erect hub forming part of the hook and defining a hook space in which a trailer tongue is adapted to be coupled, means on the hub for connecting the hook to a draft vehicle, a lock having a stud turnably carried by the hub allowing swinging the lock across the hook space to close it for the retention of said tongue, means projecting downward from the lock, riding beside the hub and taking a position in the hook space next to the hub and reducing said space for a close fit of said tongue, a pin mounted on the lock, a latch slidably carried by the pin, and a keeper on the hub being engageable by the latch upon sliding said latch on its pin and then dropping it into the keeper.

7. A towing attachment comprising a hook having an extremity defining part of a hook space and having a lip on said extremity extending away from the hook, a lock carried by part of the hook, overlying the hook space to constitute a closure and extending beyond said extremity, and a lip depending from the extension of the lock, having a return formation underlying the hook lip to provide an interengagement between the hook and lock remotely from the hook space.

GEORGE HANIQUET.